United States Patent
Register, Jr. et al.

(10) Patent No.: US 9,218,589 B2
(45) Date of Patent: Dec. 22, 2015

(54) ISSUANCE, CONVEYANCE AND MANAGEMENT OF ENDORSEMENTS

(76) Inventors: Arthur F. Register, Jr., Altamonte Springs, FL (US); Franklin J. Camper, Hueytown, AL (US)

( * ) Notice: Subject to any disclaimer, the term of this patent is extended or adjusted under 35 U.S.C. 154(b) by 887 days.

(21) Appl. No.: 12/770,336

(22) Filed: Apr. 29, 2010

(65) Prior Publication Data

US 2010/0280964 A1 Nov. 4, 2010

Related U.S. Application Data

(60) Provisional application No. 61/174,041, filed on Apr. 30, 2009, provisional application No. 61/183,222, filed on Jun. 2, 2009.

(51) Int. Cl.
*G06Q 30/02* (2012.01)
*G06Q 10/10* (2012.01)
*G06Q 10/06* (2012.01)
*G06Q 30/06* (2012.01)
*G06Q 10/08* (2012.01)
*G06Q 30/00* (2012.01)

(52) U.S. Cl.
CPC ............. *G06Q 10/10* (2013.01); *G06Q 30/018* (2013.01)

(58) Field of Classification Search
USPC ................ 705/11, 14.26, 26, 80, 1.1–912
See application file for complete search history.

(56) References Cited

U.S. PATENT DOCUMENTS

| | | | |
|---|---|---|---|
| 5,434,919 A * | 7/1995 | Chaum | 380/30 |
| 5,642,419 A * | 6/1997 | Rosen | 705/76 |
| 7,137,553 B2 | 11/2006 | Register, Jr. et al. | |
| 7,344,068 B2 | 3/2008 | Register, Jr. et al. | |
| 2002/0116634 A1* | 8/2002 | Okubo | 713/200 |
| 2003/0084288 A1* | 5/2003 | de Jong et al. | 713/168 |
| 2004/0225882 A1* | 11/2004 | Ishizuka et al. | 713/161 |
| 2005/0257253 A1* | 11/2005 | Ekers et al. | 726/5 |
| 2007/0074041 A1* | 3/2007 | Aull et al. | 713/186 |
| 2008/0109883 A1* | 5/2008 | Hernoud et al. | 726/5 |
| 2008/0156872 A1 | 7/2008 | Register et al. | |
| 2008/0178270 A1* | 7/2008 | Buss | 726/5 |
| 2009/0157559 A1* | 6/2009 | Wu et al. | 705/80 |
| 2009/0177694 A1* | 7/2009 | Olson | 707/104.1 |
| 2009/0271289 A1* | 10/2009 | Klinger et al. | 705/26 |

* cited by examiner

*Primary Examiner* — Jonathan Ouellette
(74) *Attorney, Agent, or Firm* — Jones IP Law, LLC; Dennis W. Jones (57) ABSTRACT

Systems and methods for the issuance, management and conveyance of endorsements to authorities, the system comprising an endorsement issuance module configured to issue an endorsement associated with an endorsee, wherein the endorsement prescribes to specified endorsement issuance rules, an endorsement conveyance module configured to validate the endorsement according to the specified endorsement conveyance rules, and an endorsement management module configured to maintain the specified rules according to an authority.

19 Claims, 10 Drawing Sheets

FIG. 1

Barcode contains:
    Medicine/dose
    Date
    Validation Phone #
    Dr. ID #
    Organization Code
    Location Code
    City/State Code

| DOD-CAC Field Width | DOD-CAC Field Name | PIV-CAC Field Name | PIV-CAC Field Width | |
|---|---|---|---|---|
| 1 | 1 | Version | Version | 1 |
| 7 | 6 | PersonDesignator | PersonDesignator | 6 |
| 8 | 1 | PersonDesignatorType | PersonDesignatorType | 1 |
| 15 | 7 | EdiPersonIdentifier | EdiPersonIdentifier | 7 |
| 35 | 20 | PersonFirstName | PersonFirstName | 20 |
| 61 | 26 | PersonSurname | PersonSurname | 26 |
| 65 | 4 | DateOfBirth | DateOfBirth | 4 |
| 66 | 1 | PersonnelCategory | Credential Identifier | 1 |
| 67 | 1 | Branch | | |
| 69 | 2 | PersonnelEntitlementCondition | | |
| 75 | 6 | Rank | DocumentID | 7 |
| 77 | 2 | PayPlan | | |
| 79 | 2 | PayPlanGrade | CredentialType | 2 |
| 83 | 4 | CardIssueDate | InternalControl | 4 |
| 87 | 4 | CardExpirationDate | CardIssueDate | 4 |
| 88 | 1 | CardInstanceID | CardExpirationDate | 4 |
| 89 | 1 | PersonMiddleInitial | CardInstanceID | 1 |
| | | | PersonMiddleInitial | 1 |

| PIV-CAC Field Name | PIV-CAC Field Width | PIV-CAC Field Type |
|---|---|---|
| IssuingAuthorityID | 2 | WORD |
| PacketID | 2 | WORD |
| PacketData | ?? | binary |

ISSUANCE, CONVEYANCE AND MANAGEMENT OF ENDORSEMENTS

CROSS-REFERENCE TO RELATED APPLICATIONS

This application claims benefit under 35 U.S.C. §119(e) of U.S. Provisional Patent application Ser. No. 61/174,041, entitled "A System for Automating the Management, Issuance, and Conveyance of Endorsements," filed Apr. 30, 2009, and of U.S. Provisional Patent application Ser. No. 61/183,222, entitled "A System Providing Data Interchange Between Identity Credentials," filed Jun. 2, 2009, each of which is incorporated herein by reference as if set forth herein in their entirety.

BACKGROUND OF THE INVENTION

1. Field of Invention

This invention pertains to systems and methods for the issuance, management and conveyance of endorsements to credentials.

2. Description of the Related Art

An endorsement indicates a particular party's approval, sanction, or measure of proficiency of the person or organization in possession of (holding) the endorsement. Endorsing parties typically have authority over, or expertise in, the subject matter being endorsed. Holding particular endorsements allow the holder privileges that are not available to the general public. Some exemplary endorsements that can be held are:

1. State issued teaching certificates (an endorsement of the particular formal education and/or relevant work experience of the holder) allow the holder to apply for and work at various teaching positions within the state. Particular certificates may have additional endorsements that allow the holder to apply for and work at various specialized teaching positions.
2. Vaccination records allow a child to enter public school when the records have entries (endorsements) that indicate that certain vaccinations have been administered to the child.
3. Certain codes on a Driver's License (which is itself an endorsement) can allow driving a motorcycle, or prevent driving at night.

Endorsements are conveyed in various manners. While word of mouth is effective, it is also time consuming. Typically, documents and/or credentials are issued to a person to indicate the level of endorsement by the issuing authority. Issuing these credentials circumvents the need to contact someone that can personally vouch for a person, but is also time consuming. (Throughout the remainder of this description, the term credentials can refer to either documents or other credentials.) Further, a person's credentials can become out-of-date based due to obtaining (or losing) training experience, vaccinations, work skills, or other such events.

Current practices sometimes allow the credential to be modified by adding or removing endorsements to the credential. Again, the process can typically be time-consuming and/or prone to error. Some exemplary modification of endorsements include:

1. A visa stamped on or attached to a page within a holder's passport.
2. A new vaccination entry written into a holder's International Book Of Certificates of Vaccination (W.H.O.).
3. The yearly registration sticker attached to an automobile license plate.

SUMMARY

According to one embodiment of the present invention, a system is provided for the issuance, management and conveyance of endorsements to authorities, the system comprising an endorsement issuance module configured to issue an endorsement associated with an endorsee, wherein the endorsement prescribes to specified endorsement issuance rules, an endorsement conveyance module configured to validate the endorsement according to the specified endorsement conveyance rules, and an endorsement management module configured to maintain the specified rules according to an authority.

Another embodiment includes an endorser identification unit configured to verify that a user has privilege to create an endorsement.

Another embodiment includes an endorsement issuance module further comprising an endorsee identification unit configured to verify credentials of an endorsee.

Another embodiment includes an endorsement selection unit configured for selection of endorsement options according to results provide by the endorsee identification unit.

Another embodiment includes an endorsement creation unit configured to add at least one endorsement to endorsee credentials.

Another embodiment includes an endorsement rules database capable of receiving rules from the authority. Additionally, the endorsement rules database is capable of pushing rules to the authority.

Another embodiment includes an issued registrations database capable of uploading registrations to the authority.

Another embodiment includes an endorsement validation unit to determine the validity of the endorsement and to provide validity results to an action module configured for decision making. Further, the endorsement validation unit can include an automated decision making process.

Another embodiment includes an activity upload unit configured for pushing endorsement data to at least one authority for synchronization of the endorsement data.

Another embodiment includes a rules download unit configured to receive rules and protocols from at least one authority, wherein the received rules an protocols provide for synchronized endorsement verification.

Another embodiment includes a central authority database for rules and protocol associated with valid endorsement registrations.

Another embodiment provides for the endorsement management module to receive the specified endorsement issuance rules from the endorsement issuance module.

Another embodiment provides for the endorsement management module to receive the specified endorsement conveyance rules from the endorsement conveyance module.

Another embodiment provides for the endorsement management module to push specified management endorsement rules to the endorsement issuance module as specified endorsement issuance rules.

Another embodiment provides for the endorsement management module to push specified management conveyance rules to the endorsement conveyance module as specified endorsement conveyance rules.

Other systems, methods, features and advantages of the present invention will be or become apparent to one with skill in the art upon examination of the following drawings and detailed description. It is intended that all such additional systems, methods, features and advantages be included within this description and be within the scope of the present disclosure.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Reference is now made in detail to the description of the embodiments of systems and methods for issuance, management and conveyance of endorsements as illustrated in the accompanying drawings. The invention may, however, be embodied in many different forms and should not be construed as limited to the embodiments set forth herein; rather, these embodiments are intended to convey the scope of the invention to those skilled in the art. Furthermore, all "examples" given herein are intended to be non-limiting.

Figure 1:
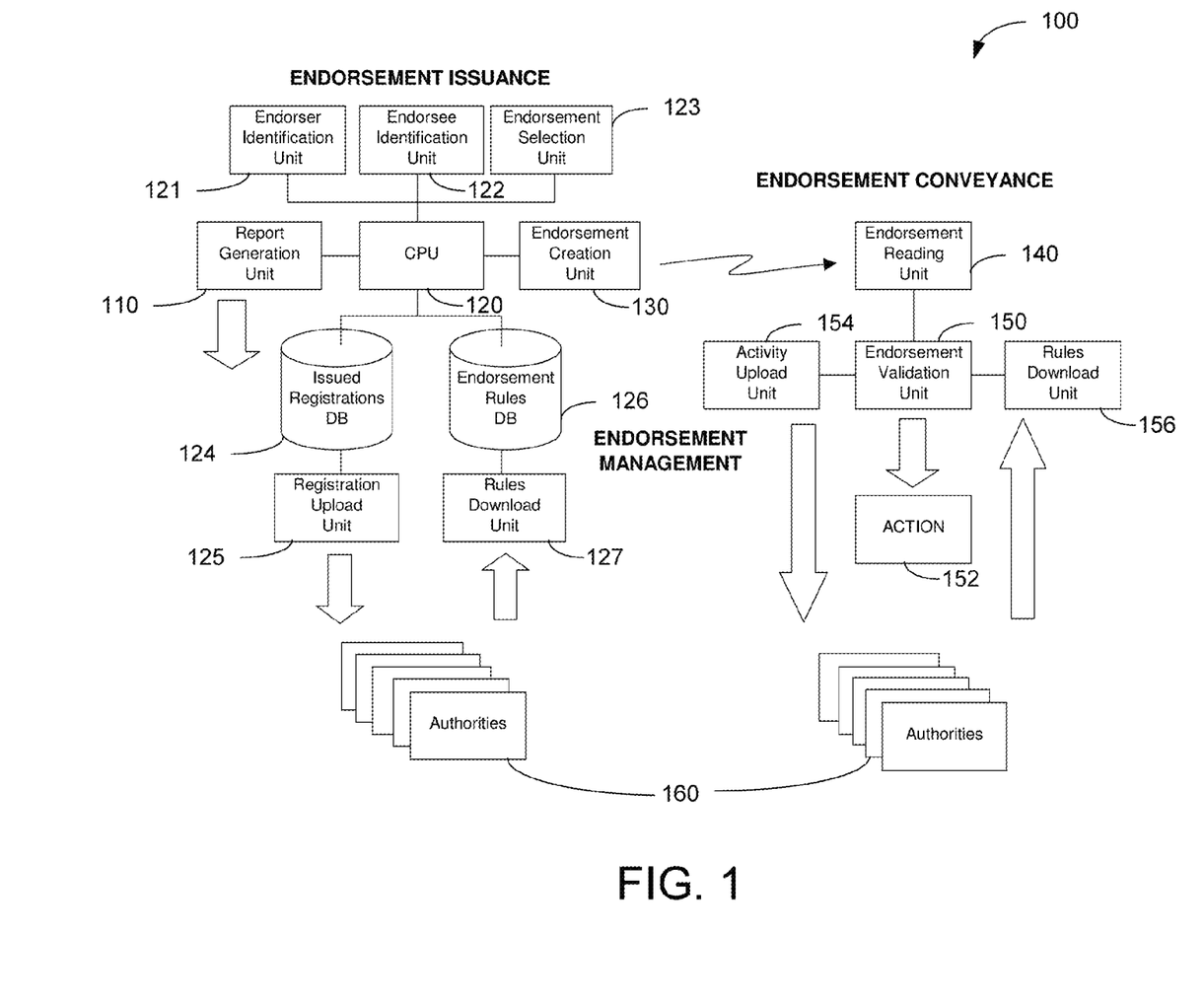
FIG. 1 is an embodiment of a system for the issuance, management and conveyance of endorsements to credentials.

Turning now to the drawings, FIG. 1 is an overview of a system 100 for automating the issuance, management and conveyance of endorsements to credentials. The system 100 is particularly well suited for field endorsement of large numbers of people and is typically constructed from commercial-off-the-shelf ("COTS") hardware.

The system 100 includes a CPU 120 which can be any computing system. One embodiment of a CPU 120 is a COTS desktop PC as typically used in an office, or a COTS laptop PC as is typical for field use. Field issuance of an endorsement can optionally include a mobile phone (with a camera) as the CPU 120. The Management, Issuance, and Conveyance of Endorsement ("MICE") software runs within the CPU 120. It should be readily appreciated that many different types of computing systems could be used for the CPU 120.

Upon starting the MICE software, the endorser identification unit 121 requires identification from the operator before allowing further software operations. As a typical minimum, passwords are used as a method of operator identification. More secure instances can be provided by the use of biometrics, smart cards, and such like, for providing operator identification. Once the endorser identification unit 121 determines that the operator is qualified to be an endorser, the system 100 enters into endorsement mode. It should be noted that any of a number of automated entry, selection, and classification methods known to those skilled in the art may be used within this endorser identification unit 121 to increase accuracy, efficiency and speed.

An endorsee identification unit 122 is used for identification of the user seeking the endorsement where identification is typically used as the first step in issuing a new endorsement. The user typically presents certain credentials to the endorser. Automated technology is typically utilized to capture information stored within and/or printed upon the credential.

One embodiment utilizes a drivers license or state identification card scanner to capture the image of the credential while using optical character recognition to deliver the string values of the various fields printed on the credential.

Alternatively, a 2D barcode scanner is used to capture the image of the AAMVA (or other standard, e.g. USA CAC card) barcode printed upon the credential. In this instance, the endorsee identification unit 122 interprets the barcode scan and delivers the string values of the various fields stored within the barcode. Since certain drivers license and other authorities encrypt their barcodes, cooperation with these authorities is necessary for interpretation of their barcodes.

One embodiment scans the magnetic stripe that is found on certain credentials.

Another embodiment for identification of the party is use of a smart-card scanner, proximity card scanner, and/or various other computer input devices to scan and/or examine the credentials provided by the party.

Identifying the party without the use of credentials is necessary in some cases. One embodiment for identification includes a fingerprint scanner interfaced to the endorsee identification unit 122 for collection of fingerprint images of the party. The raw image(s) collected from the person can provide forensic evidence that a person participated in the endorsement process. This is especially valuable in mass endorsement cases where the person is unable to identify themselves (trauma, physical infirmities, etc.) The fingerprint scanner can also be interfaced to other parts of the system for their use in biometric recognition and/or image collection.

The endorsee identification unit 122 also supports enrolling a person based upon their affirmation of whom they claim to be, or upon observed physical characteristics of the individual. While supported, this mode of identification is typically the least desirable and is preferably only be used in emergency and/or low value applications.

It should be noted that any of a number of automated entry, selection, and classification methods known to those skilled in the art may be used within the endorsee identification unit 122 to increase accuracy, efficiency and speed.

An endorsement selection unit 123 provides guidance to the endorser through the endorsement process once the person is identified as a potential endorsee. Specific endorsements are presented as endorsement options based upon rules within an endorsement rules database 126 (discussed further below), privileges implied and based upon the results of the endorsement identification process, privileges implied based upon the results of the endorsee identification process, and privileges embedded within the particular MICE configuration.

Upon selection of a particular endorsement option, the endorser is presented with one or more screens to allow the validation of particular prerequisites of the selected endorsement. The validity of particular validation steps relies upon the integrity of the endorser. For example, at each step, multiple parties may serve as a team of endorsers to provide multiple expertise inputs and/or to validate each other's performance.

Part of the endorsement selection process could involve associating the endorsement and/or endorsee with particular objects, skills, courses, and the like. One embodiment provides a barcode scanner to automate the customization of a particular endorsement.

For example, in the case of validating that someone has received a certain vaccination (e.g., see FIG. 2, FIG. 4 and FIG. 8), the barcode scanner might be employed to scan the barcode attached to the vial containing the vaccine. This provides automated collection, and subsequent entry into the endorsement, of certain information about the vaccine such as manufacturer, product number, lot number, expiration date, etc.

Figure 2:
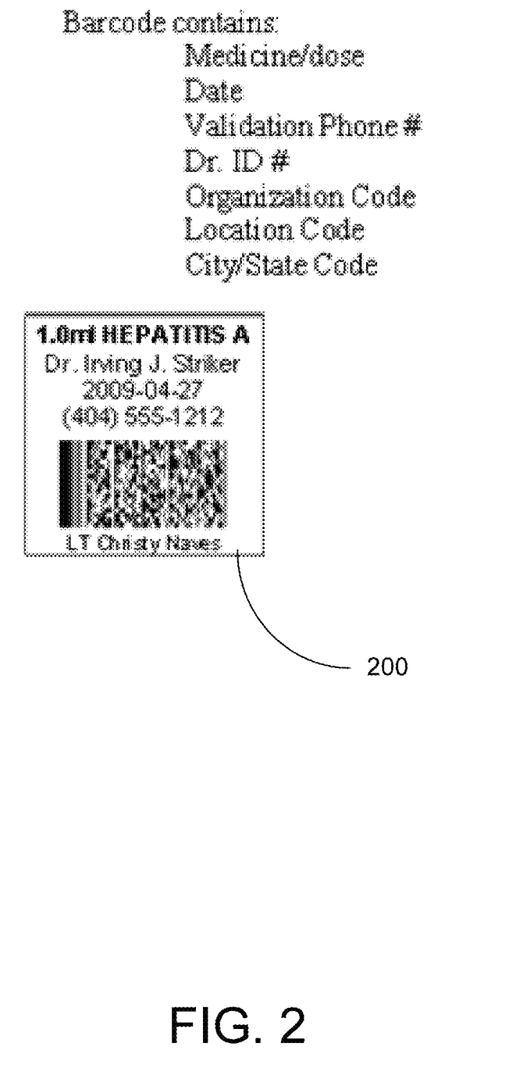
FIG. 2 is an illustration of a barcode to include endorsements according to FIG. 1

FIG. 2 is an exemplary illustration of a barcode 200 to include endorsements. The barcode 200 includes information such as medicine/dose, date, validation phone number, doctor identification, organization code, location code, city and state, among other possible information.

Another exemplary validation can be a card that lists particular training courses with a barcode 200 identifying the course placed next to each course selection. During the validation process, the barcode 200 associated with each course taken is scanned. Subsequently each course selected is entered into the endorsement.

It should be noted that any of a number of automated entry, selection, and classification methods known to those skilled in the art may be used within the endorsement selection unit 123 to increase accuracy, efficiency and speed.

A report generation unit 110 logs relevant activity within local databases. Any of a number of automated report generation methods and/or packages known to those skilled in the art may be used within the report generation unit 110 for production of reports. Standard COTS devices may be used to output such reports.

An endorsement creation unit 130 creates a document to be added to the endorsee's credentials once the decision to issue an endorsement is made. One embodiment of such an endorsement is a 2D barcode printed on a sticker that is affixed to one of the user's credentials.

One embodiment of the endorsement uses a PDF-417 barcode format to record various particulars of a vaccination record that is printed on a 0.5"×0.5" stick-on label. Along with the barcode, human readable information is provided for use in less secure applications.

Other barcode formats may be used, depending upon space, validation, and/or other requirements. For example, QR Code ("Quick Response Code") may be used where low volume validation is required in many locations. Codes such as QR Code lend themselves to use of standard cell phones to scan the code, saving the cost of a dedicated barcode reader, CPU, etc.

Figure 3:
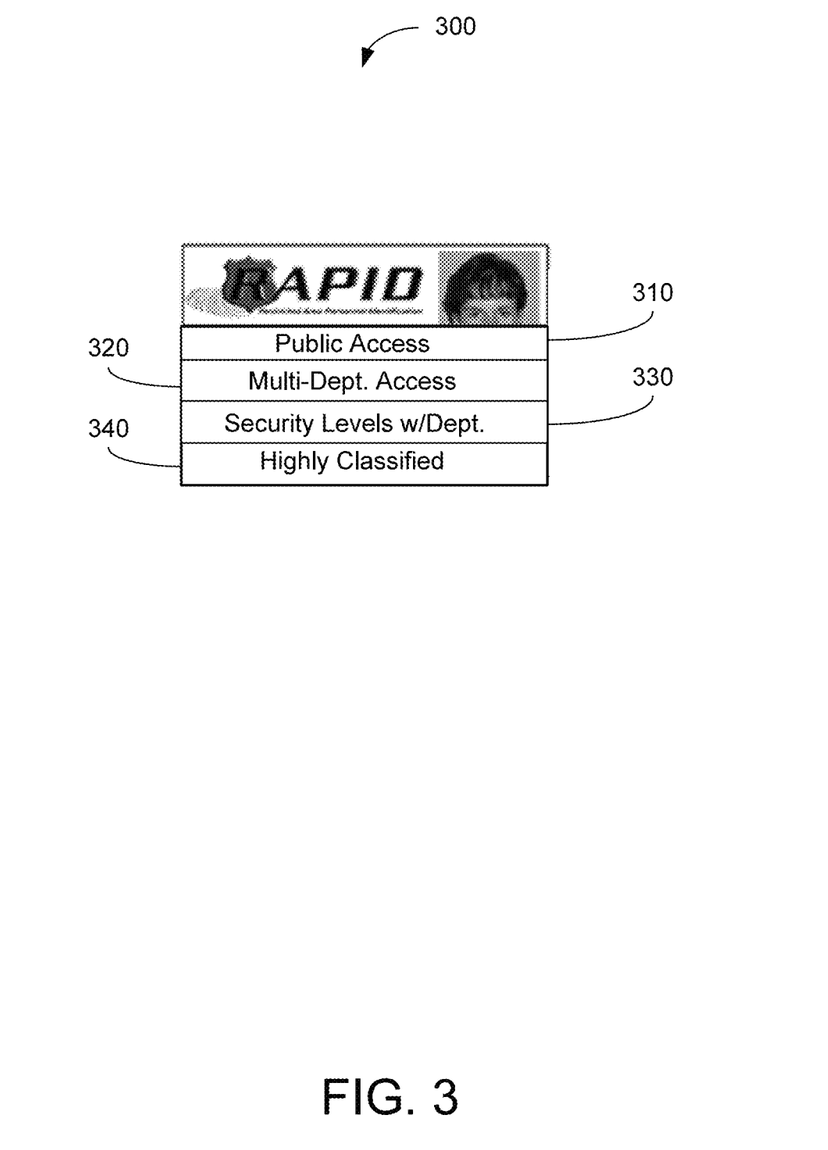
FIG. 3 is an exemplary digital security device for including endorsements according to FIG. 1

Some embodiments of the barcode contained within the endorsement contain digital security devices that make the endorsement self-validating and forensically capable of validation as in FIG. 3. The initial embodiment of this invention makes use of the digital seals provided within the P5-ID™ system from Digital Data Research Company (ref. U.S. Pat. Nos. 7,137,553, 7,344,068, etc.). The barcode within these embodiments utilize P5-ID's private field(s) to insure that upon conveyance the data is in fact valid.

FIG. 3 is an exemplary digital security device 300 that includes public access information 310 (such as name, address, etc.), multi-department access 320, security levels 330, and highly classified information 340 (such as internal controls, biometric identifier access, etc.).

The biometric ID is typically stored on the target storage volume. A hash of the biometric ID and/or its storage location, and perhaps other audit trail data may be saved into a second encrypted record (the first Linked Node). The encryption keys and methodologies used to encrypt the second record are calculated based upon information within the biometric key, along with other installation specific considerations, including provisions for the user entering a password key.

It should be noted that other storage devices may be used in place of the 2D barcode. For example, RFID tags are very price effective, and can offer enough storage space to support self-validation. Any of a number of other storage devices known to those skilled in the art may be used within the endorsement creation unit 130 for creating the endorsement.

Figure 4:
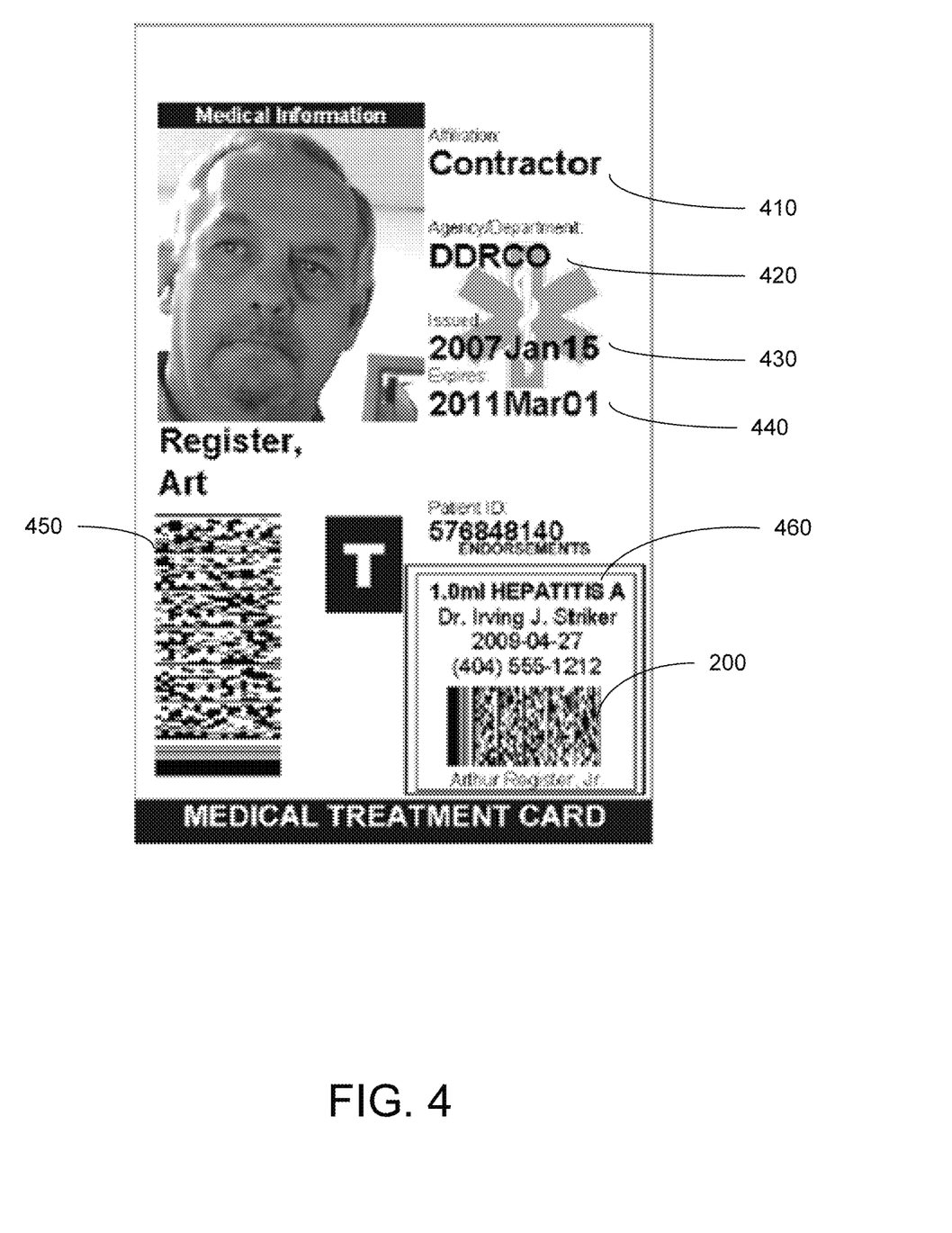
FIG. 4 illustrates an exemplary ID card with endorsements affixed.

FIG. 4 illustrates an exemplary ID card 400 with endorsements affixed. In this example, text information is provided such as, affiliation 410, agency/department 420, issue date 430 and expiration date 440. An interface barcode 450 is also included on the ID card 400. The interface barcode 450 can also include endorsements printed on the face of the interface barcode 450, however these are not required. A text endorsement field 460 provides visual identification of the endorsements that are typically included in barcode 200.

An RFID tag 450 can also be included to provide storage for self-validation and other information. RFID tags 450 can be included within the ID card 400, the barcode 200, or even the interface barcode 450, but also can be affixed to each as, for example, a sticker. It should be noted that there are multiple ways to affix RFID tags to a card or other device.

Once the endorsement is created it is typically affixed to one of the endorsee's credentials. In some cases it is desirable to issue a new credential to the endorsee, and the interface barcode 450 typically includes the endorsements of the new credential. For example, the endorsee might not have an existing credential that is valid for the endorsement. In one embodiment, the P5-ID system from Digital Data Research Company is used to create a PVC, credit-card sized, generic ID card that includes the basic health information of the endorsee within the interface barcode 450, which is then affixed to the ID card.

The system 100 includes an issued registrations database 124 for maintaining issued registrations and other relevant activity. Any of a number of database management systems can be used within the system 100 as will be readily appreciated by those of skill in the art.

In addition to the report generation unit 110, discussed above, a registration upload unit 125 is used to push data to various authorities, or the data can be pulled by such authorities for changes and/or additions to the endorsements and/or activities. Any of a number of synchronization methodologies may be used within the registration upload unit 125 as will be readily appreciated by those of skill in the art.

The system 100 maintains an endorsement rules database 126 for defining acceptable, issuance protocols, and the like. Any of a number of database management systems can be used within the system 100 as will be readily appreciated by those of skill in the art.

A rules download unit 127 is used to pull rule definitions and protocols from various authorities. Alternatively, rule definitions and protocols can be sent to the rules download unit 127 by such authorities. Any of a number of synchronization methodologies may be used within the rules download unit 127 as will be readily appreciated by those of skill in the art.

Endorsement Conveyance

Endorsement conveyance typically begins when the endorsement is presented to some third party. The first step in the process is to read the endorsement at an endorsement reading unit 140. The endorsement validation unit 150 typically contains a CPU, such as a mobile phone, a laptop PC, a desktop PC, and such like. In some embodiments, the endorsement reading unit 140 includes an input device to scan the endorsement and collect the information that is contained within the endorsement. While it is sometimes acceptable in lower security applications for the operator to visually inspect the endorsement to make a judgment as to the validity and extent of the endorsement, it is typically preferable to utilize automated input and recognition technology wherever feasible.

In one embodiment, the endorsement validation unit 150 is a mobile phone and an input device can be a camera that is integral to the phone. In another embodiment, the endorsement validation unit 150 is a PC and the input device is a high-speed 2D barcode scanner, for example. Any of a number of other input devices may be used within the endorsement validation unit 150 for reading the endorsement, as will be readily appreciated by those of skill in the art.

Once the endorsement is read, the endorsement validation unit 150 analyzes the structure and data of the endorsement to determine whether the endorsement is valid. In some embodiments, the endorsement validation unit 150 contains a fingerprint scanner or other biometric device to determine if the endorsement was actually intended for the endorsement holder. Also that same device can be used to record the fact that the holder presented the endorsement at a particular location, date, and time. The endorsement validation unit 150 can be either an automated unit or a unit that requires user intervention.

Additionally, the endorsement validation unit 150 typically includes a rules download unit 156 for accessing rules and other endorsement information for the validation process. The rules download unit 156, and thus also the endorsement validation unit 150, typically has access to a database that serves as a repository for rules available to the endorsement validation unit for decision-making until the rule changes. The database can also include other endorsement information for influencing the validation process. It should be readily appreciated that the endorsement validation unit 150 can alternatively have access, locally or via network connection, to other databases and/or tools for rules and other endorsement information.

In some embodiments, the endorsement validation unit 150 searches for and analyzes the digital and/or physical security devices expected and/or found within the endorsement, incorporating the results of the analysis into the overall decision making process.

In embodiments utilizing automated endorsement conveyance applications, the results of the validation process are passed to another process and/or recorded.

In non-automated embodiments for endorsement conveyance applications, the results of the validation process are typically displayed on a human readable output device and/or recorded.

An action 152 is determined by the operator based upon the results displayed from the endorsement validation unit 150 in non-automated endorsement conveyance applications.

For automated endorsement conveyance applications, the endorsement validation unit 150 provides another application unit with validation results. An appropriate action 152 is then determined by that application.

In one alternative embodiment, the endorsement validation unit 150 includes an activity upload unit 154 for pushing data to various authorities, or such authorities can poll the activity upload unit 154 for activity. The activity upload unit 154, and thus also the endorsement validation unit 150, typically has access to a database that serves as a repository for synchronization methodologies. Any of a number of synchronization methodologies known to those skilled in the art may be used within the activity upload unit 154 for such purposes. Any of a number of data stores known to those skilled in the art may be used by the activity upload unit 154, and thus also the endorsement validation unit 150, to maintain the activity data. It should be readily appreciated that the endorsement validation unit 150 can alternatively have access, locally or via network connection, to other databases and/or tools for synchronization activities.

In some embodiments, much of the speed shown in the endorsements validation is due to distributed database techniques employed. Much of the data that is needed to control validation is typically pre-positioned in local databases. The remainder of the information is carried on the endorsement and is delivered by the endorsement holder. Using the referenced data validation techniques enables the data to be trusted without referencing network databases. Network bandwidth requirements are significantly decreased and delays during the decision making process are minimized.

Figure 5:
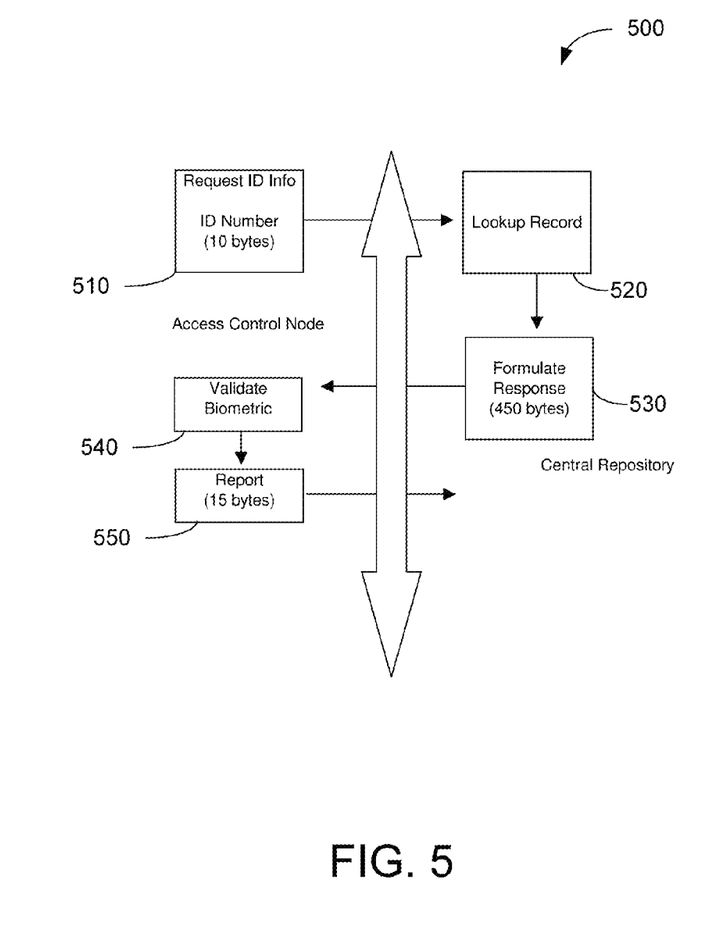
FIG. 5 is an example of central repository validation.

FIG. 5 is an example of central repository validation 500. A centrally located set of biometric records is relative to access control, each record of about 450 bytes in length. The endorsement carried consists of an ID number 510 of approximately 10 bytes. Record lookup 520 and formulation of response 530 occur at the central repository.

There are some 475 bytes of network payload during each biometric validation event 540. As significantly, the network traffic is on the critical path of the decision process. Depending upon the number of times each individual is biometrically validated, significant resources can be involved prior to generation of a report 550.

Figure 6:
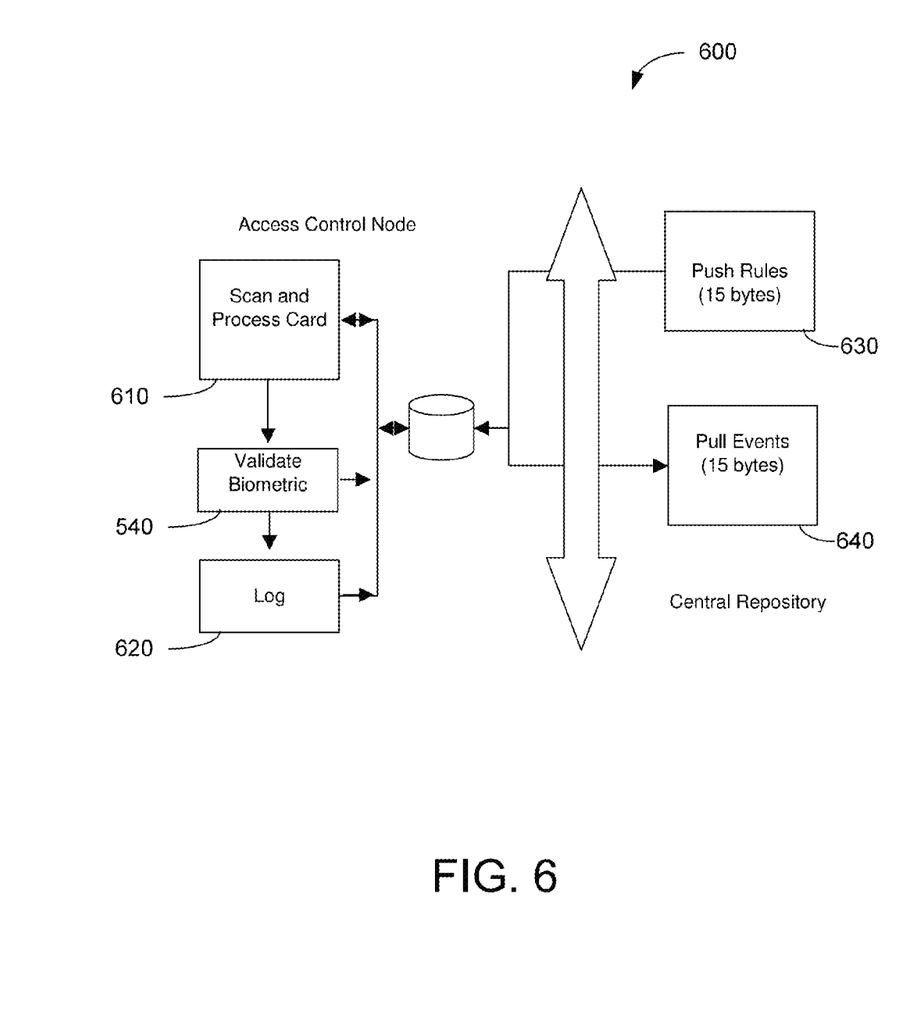
FIG. 6 depicts central repository validation with reduced network traffic.

FIG. 6 depicts central repository validation with reduced network traffic 600. One advantage of the system 100 is that if it were deemed necessary or desirable to validate through a central repository, the method of endorsement offers certain advantages due to having a record pre-positioned on the scanned card 610. A packet can be pushed 630 that contains the serial number along with a hash of the record. The central authority can then compare the hash with a hash of the central copy record and can respond with a validity decision 540. The record itself does not need to be part of the network traffic.

In an optional embodiment, the rules download unit 156 can pull rule definitions and protocols 640 from various authorities, or alternatively, authorities may send rule definitions and protocols to the rules download unit 156. Any of a number of synchronization methodologies known to those skilled in the art may be used within the rules download unit 156 for such purposes. Any of a number of data stores known to those skilled in the art may be used by the rules download unit 156 to maintain the rules data.

Figure 7:
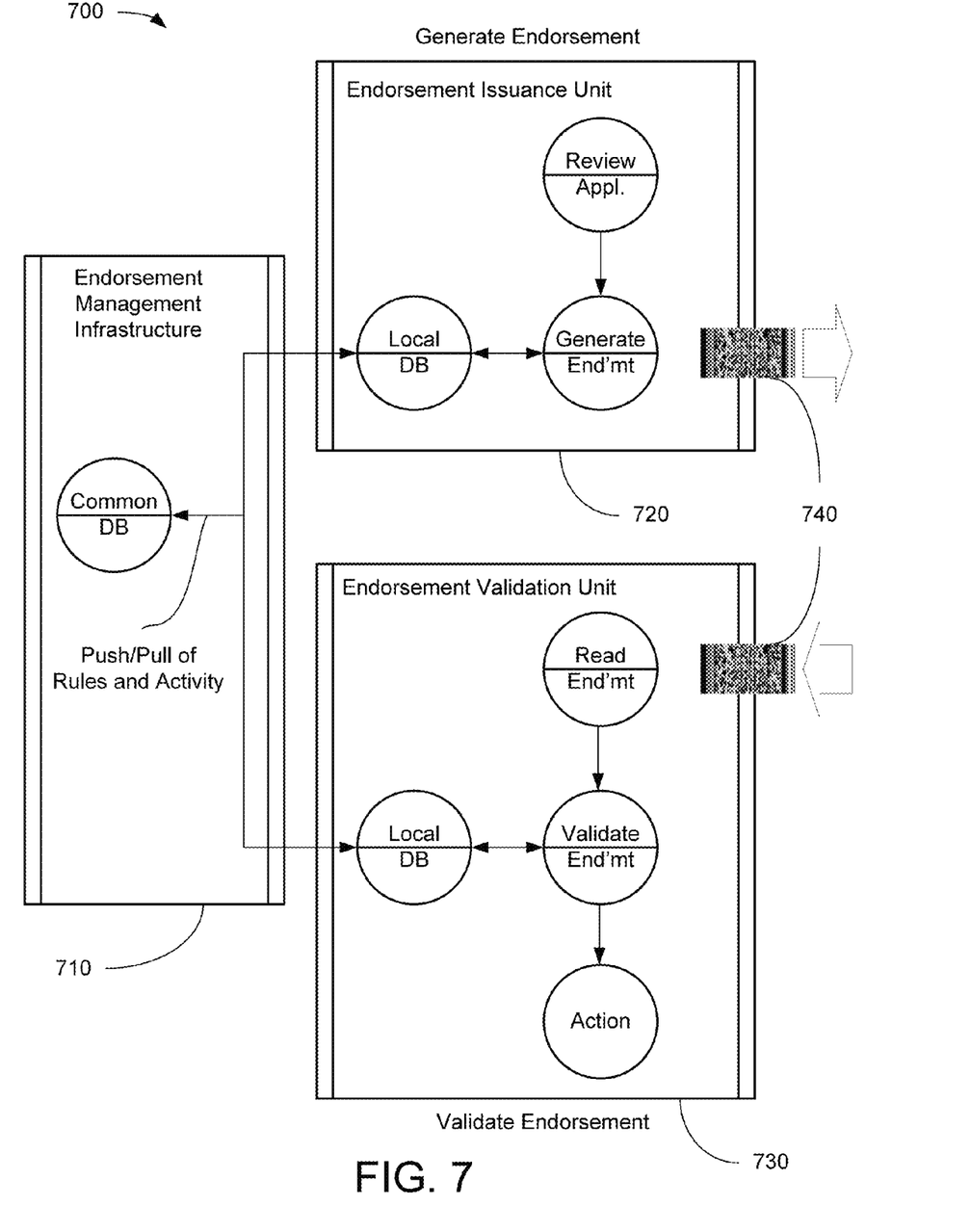
FIG. 7 illustrates the endorsement rules activity for management of the generation and validation of endorsements.

FIG. 7 illustrates the endorsement rules activity 700 for management of the generation and validation of endorsements. The endorsement management infrastructure 710 accesses a common database for endorsement rules. Rule definitions and protocols can be pulled into the common database for management by authorities. Alternatively, authorities can push rule definitions and protocols for generation at the endorsement issuance unit 720, or for validation at the endorsement validation unit 730. The endorsement issuance unit 720 and the endorsement validation unit 730 can also have their own local database to contain rule definitions and protocols.

Figure 8:
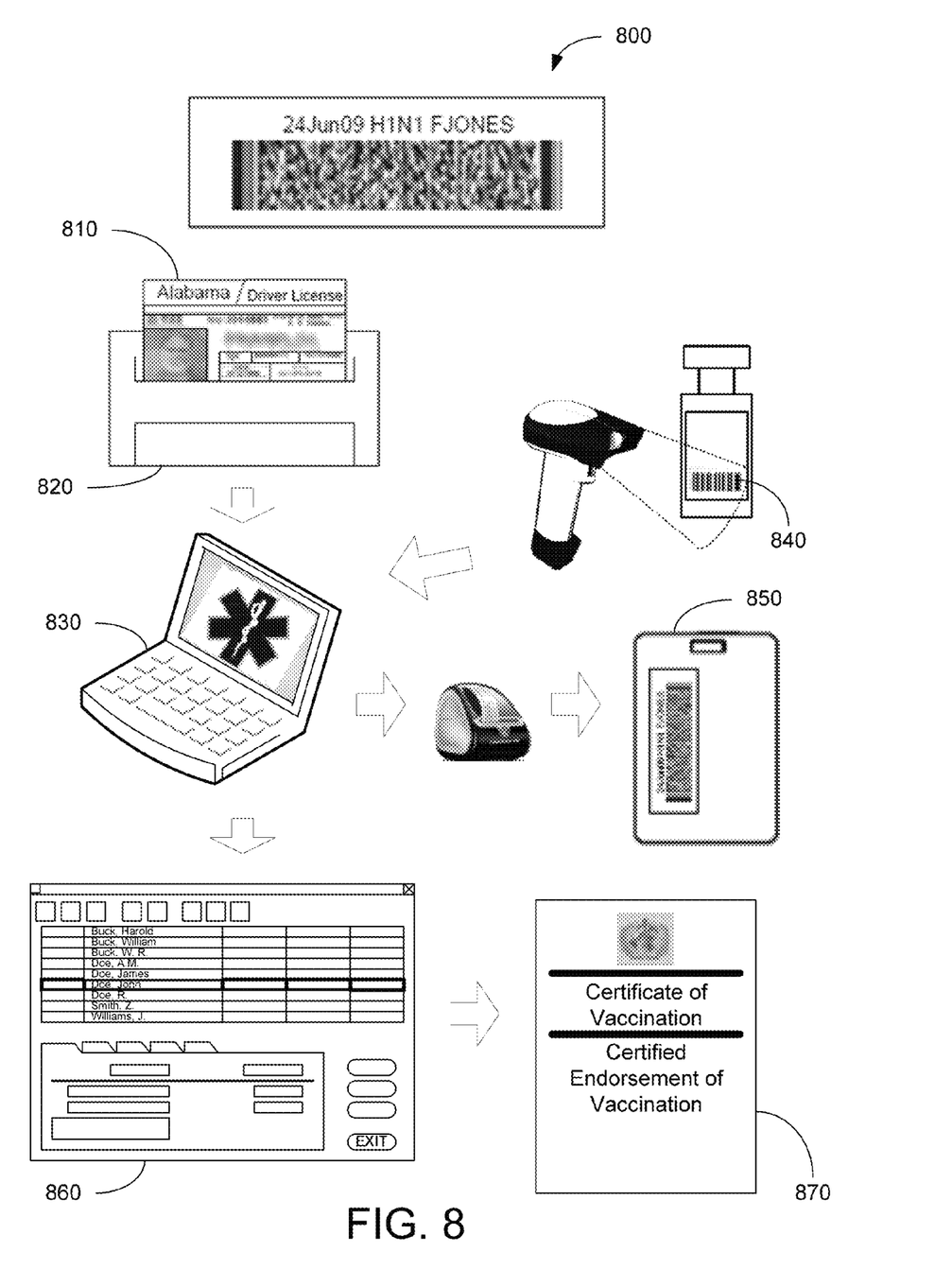
FIG. 8 is an illustration of an a field pandemic vaccination kit.

FIG. 8 is an illustration of an exemplary use of the system 100 for a field pandemic vaccination kit 800. Initial identification 810 is scanned for a user that is receiving a vaccination. The identification 810 is scanned via a card reader 820. User information is retrieved from the card reader 820 via a laptop PC 830. The vaccine information 840 is also scanned into the laptop PC 830. The record data is used to generate a barcode label in a machine readable and human readable format. The barcode label is typically placed on a credential card 850. The information is also added to a database as shown in screenshot 860 and passed, for example, to state health agencies, CDC, WHO, etc. A credential of immunization report 870 is also created.

Data Interchange

Other features of the invention include methods of data interchange between 2D barcodes printed on cards such as DoD common access cards ("CAC"), on FIPS 201-1 compatible identity cards, and on other identity credentials. The approach is extensible, building upon the specification used to construct the PDF-417 barcode currently printed on DoD CAC cards. A level of interoperability is enabled between non-Federal identity card issuers and Federal card issuers, while also allowing each party to modify their particular barcode contents to meet local needs. The included barcodes also serve as endorsements of various traits of the authorized card holder.

Parties to the data interchange process can include the barcode issuer, the barcode issuing authority, a centralized naming authority, a barcode issuance system, a barcode reading element, a barcode data consumer, and a barcode validating authority.

The barcode issuer is the party that prints the barcode onto the identity credential.

The barcode issuing authority is the issuer within the namespace of a particular block of barcode serial numbers. Each such block of serial numbers is assigned a barcode issuing authority ID number ("Issuing Authority ID").

The centralized naming authority is a trusted, independent organization that (1) assigns both barcode issuing authority ID's and blocks of barcode serial numbers to barcode issuers, (2) serves as a repository for barcode packet and field design information, and (3) maintains a list of revoked barcodes.

The barcode issuance system enforces compliance of the barcode creation process to specifications and creates the barcode graphic image, delivering it to the issuer.

The barcode reading element is a system that reads the barcode, interprets the data contained within the barcode, and delivers that data to the barcode data consumer.

The barcode data consumer is a process or application that receives and processes the scanned barcode data.

The barcode validating authority is one of potentially several parties that are available to (1) perform background checks on the data to be included within the barcode, and/or the suitability of a particular individual to possess a barcode, and to (2) validate the data within specific issuing authority barcodes after the reader decodes the barcode. The validating authority can provide additional data to the user about the ID in question, including appearance on watch lists, wants and warrants, privileged information, and the like.

The issuing authority model of this interchange format (tagged version hex 7C) is based on a model of up to 65535 Issuing Authorities, each assigning up to 65535 barcode serial numbers to issued barcodes.

It is important to note that individual issuers may have multiple issuing authorities assigned to them based on the number of issuing stations that they require. Additionally, a particular issuing station can also have additional authorities assigned if the count of issued documents nears or exceeds its quota.

To accommodate issuers with both larger and smaller issuance count requirements, one or more classful issuance models (along the lines of the Internet address specification in use until around 1993) are incorporated into ongoing interchange format releases.

The naming authority assigns and maintains an audit trail of issuing authority ID's and blocks of barcode serial numbers that have been assigned to issuers.

The issuing authority has responsibility to assign specific barcode serial numbers to issued barcodes. Such serial numbers may not be re-assigned within the namespace of the issuing authority after issuance.

The issuance system insures compliance of the barcodes to this section of the specification.

Regarding barcode symbologies, barcodes provide an inexpensive, passive data transfer mechanism that is resistant to modification and data-leakage.

Two-dimensional barcodes are preferred over one-dimensional barcodes due to their increased data capacity, enabling them to be utilized within non-networked applications and conditions.

The barcodes on the card typically use PDF-417 symbology, primarily to capitalize on the base of readers currently being used to read DoD Common Access Card barcodes.

For barcode positioning, the barcode(s) can be placed on either the front of the ID card in Zone 6 and/or on the back of the card in Zone 8 as specified within FIPS 201-1.

Alternatively, additional areas of the card that are specified within FIPS 201-1 as being optional data areas may be used by either barcode in order to expand the amount of data possible to be encoded within the code.

Figure 9:
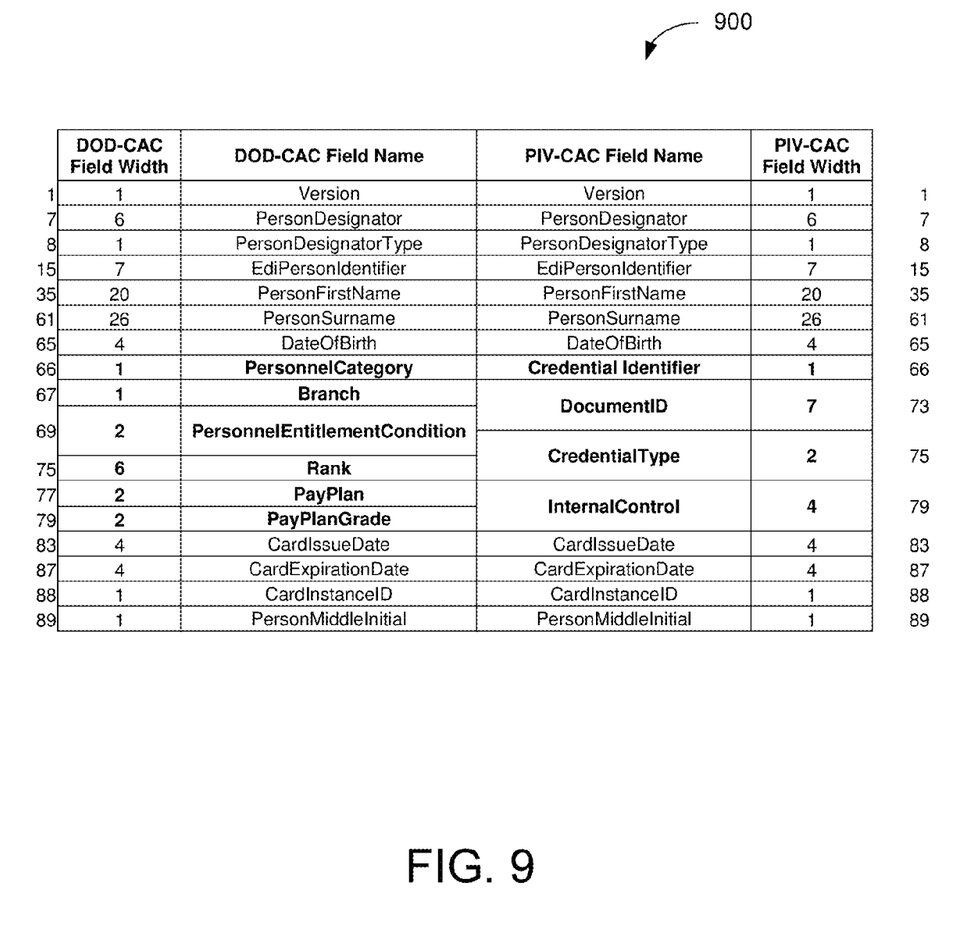
FIG. 9 depicts a typical barcode format specified to be interoperable with the DoD Common Access Card.

FIG. 9 depicts a typical barcode format 900 specified to be interoperable with the DoD Common Access Card PDF-417 barcode as specified in Section 2.2 within "Common Access Card & Uniformed Services Identification Cards Barcode Software Development Kit", Volume I, Version 6.2, published by the Office of the Under Secretary of Defense, Defense Manpower Data Center, and DoD Common Access Card Center on 22 Dec. 2004. The barcode described within Section 2.2 of the referenced document is referenced as a "DoD-CAC Barcode".

Codes that meet the data-interchange specifications of this document are referred to as "PIV-CAC Barcodes".

The PIV-CAC Barcode can consist of an ASCII, fixed field format data part ("Barcode Header"), a binary data part ("Barcode Packet"), or both.

The barcode header is typically 89 bytes in length with field layout and type largely congruent with the barcode described in 4.1 above. Bytes 66 through 79 have different layouts and meanings between DoD-CAC Barcodes and PIV-CAC Barcodes. Certain areas of the data storage packet are mapped to be used differently by different communities. Database driven tables are used to define the various fields and field structures. A 4-byte numbering schema is utilized to enforce uniqueness of serial numbers across multiple issuers. Data seals are used to validate the data within the packet.

Version. DoD-CAC Barcodes (version 6.2) fix the version field code at either '1' or 'N', depending upon whether or not the PersonMiddleInitial field is present. Initially, PIV-CAC Barcodes will fix the version field at 'N'. PIV-CAC systems should be able to correctly read either version barcode.

Greater interoperability might be gained if DoD issued a particular version field code for PIV-CAC Barcodes.

CredentialIdentifier. Typically, the PIV-CAC Barcodes are read in an environment having many differing barcode formats. PIV-CAC Barcodes for this version fix the CredentialIdentifier field value at '|' (hex 7C) to allow greater confidence in determining the barcode type when reading the barcode. This code was arbitrarily chosen because it does not conflict with any of the specified values allowed for the DoD-CAC PersonnelCategory field.

Subsequent versions of this interchange format identify themselves by fixing the CredentialIdentifier field value to values that are unique to that interchange format version.

DocumentID (Base32, compressed) (Document Serial Number, Issuing Authority ID). After decompression, this is a packed, little endian record. The right two bytes consist of the Issuing Authority ID (Windows WORD type), the left two bytes consist of the document serial number (Windows WORD type).

CredentialType (Base32, compressed). This instance of the interchange format (hex 7C) reserves 1023 credential types that may be published for each Issuing Authority to the Naming Authority. The value of 0 is reserved to indicate that the credential type has not been published. This field, when decompressed, contains an ID value, sequentially assigned to specific combinations of Zone 10 (Agency, Department, or Organization) and Zone 8 (Employee Affiliation) data. The Issuer shall publish to the Naming Authority the table of field values associated with each new (Zone 10, Zone 8) data pair. As part of the barcode decoding process readers shall lookup the ID (based on the Issuing Authority ID) from the tables maintained by the Naming Authority in order to deliver the Zone 10 and Zone 8 data to the User.

InternalControl (Base32, compressed). This instance of the interchange format (hex 7C) calls for the fields InternalControl and CardInstanceID to be used in conjunction with each other for ID validation by the card issuance and reading systems. Data placed within the CardInstanceID field should be consistent with the DoD-CAC specification, except that it is not necessary to make that field random, only that it (very probably) will vary if the barcode is re-issued. These fields are to be used to enable a covert feature to be embedded within the barcode. The covert feature can be used forensically to determine attempted forgeries. The covert feature can be used as measure of confidence in the barcode's validity when network validation is not feasible. Confidence levels approaching 1,048,575 to 1 are possible using these fields to implement well-designed covert features. The validation methodology used with the covert feature is proprietary to and is determined by agreement between specific sets of Issuers, Issuance Systems, Readers, and/or Validating Authorities. The validation methodology should be limited to a very few people on a "need to know" basis. Specific, care should be taken to insure that methodology not be entered into the public record.

Barcode Packet (binary data part). The purpose of the barcode packet is to allow issuers and users to define barcodes to convey information between each other that may be needed for specific applications and/or locations.

Barcode Packet Model. This instance of this interchange format (tagged version hex 7C) is based on a model of up to 65535 Issuing Authorities, each assigning up to 65535 barcode packet serial numbers to particular binary packet definitions. It is important to note that individual Issuers can have multiple issuing authorities assigned to them based on the number of packet designs that they require. Additionally, a particular packet design station can have additional serial numbers assigned to it if the count of issued packet design nears or exceeds its quota. To accommodate issuers with both larger and smaller packet design count requirements, it is anticipated that one or more classful issuance models (perhaps along the lines of the Internet address specification in use until around 1993) will be incorporated into upcoming interchange format releases. The naming authority typically serves as a repository for packet and field definitions. Other parties can also share packet and field definitions between themselves without publishing to the naming authority. It is the responsibility of the issuing authority to assign packet serial numbers. Such numbers may not be re-assigned within the namespace of the issuing authority after issuance. The issuance system insures compliance of the barcodes to this section of the specification.

Location. If both a barcode header and a barcode packet are contained within a particular barcode, the barcode header is placed in the first 89 bytes of the barcode. Because of the (typically) increased area of the barcode packet image vs. the barcode header image, the barcodes containing a barcode packet are typically located in Zone 8 as specified by FIPS 201-1 or in other areas of the card that are specified by FIPS 201-1 as being optional data areas.

Figure 10:
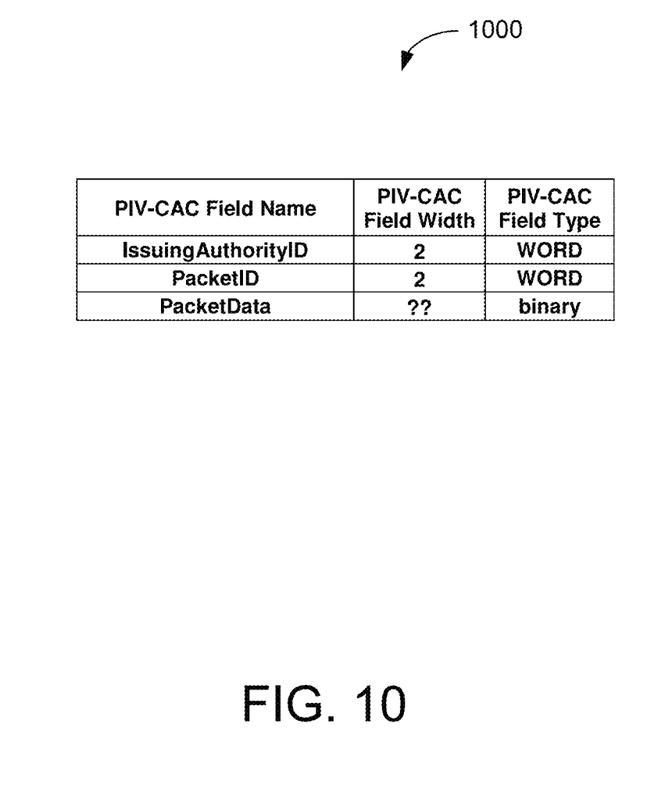
FIG. 10 depicts a field layout for an issuing authority ID and the associated packet ID and packet data.

FIG. 10 depicts a field layout 1000 for an issuing authority ID and the associated packet ID and packet data.

IssuingAuthorityID (WORD). The issuing authority ID as assigned by the naming authority.

PacketID (WORD). The Packet Number is assigned by the issuing authority.

PacketData (binary). Based on shared knowledge of the PacketData field's internal structure, cooperating parties can encode, and/or decode the data embedded within this field.

GPS latitude longitude information may used within the system. Specifically, for example, LatLong can be used as an identifier (Session ID) for the request. For compression of addresses, areas are identified by LatLong rather than multi-line addresses. Auto input of location where data is being read or collected. For security purposes, request from location outside allowable areas are not served.

Validation of endorsement barcodes on the web are provided by a dedicated program protocol. The program has user credentials embedded and/or requires login. After a user scans an endorsement barcode, the program looks up or reads the URL associated with the endorsement barcode. A web server validates users credential, endorsement information and optionally the GPS LatLong then serves page.

Validation of endorsement barcodes can also be provided by an external program protocol, such as a cell phone for example. The device serial number and/or IP address is used as a session ID. The user scans the endorsement barcode and the program looks up or reads the URL associated with the endorsement barcode. Validation request are logged via a web server under the session ID. The user scans their endorsement for reading endorsements. The web server validates the credential, and if okay, presents pages responding to requests waiting under the session ID.

Interoperable Barcode Exchange Format

The process and naming conventions associated with providing a reference implementation of the interoperable barcode exchange format are defined and described below.

Interface Barcode: A barcode that is used to convey information from one application to other applications.

Packet: The data contained within the Interface Barcode along with the certain specified data structure used to encode that data into the barcode.

Packet Design: The specific structure of a packet. This includes (1) a list of logical field names that are included in the packet, (2) the particulars that describe the type of data contained within each included field, and (3) the techniques to be used to store each field's data within the Interface Barcode.

Packet Design Database: A series of tables within a relational database that are used to store the particulars of various packet designs.

Local Packet Design Database: A standalone repository of local and third party packet designs sufficient to generate and interpret a set of Interface Barcodes.

Common Packet Design Database: A repository of published Packet Designs. Local packet design database's may subscribe to such databases in order to publish packet designs to the user community, and/or receive packet designs published by other users.

Referring again to FIG. 7, discussed briefly above, an endorsement issuance unit 720 creates an interface barcode:

1. Specify and create the naming conventions and methodologies necessary to identify and specify Packet Designs.
2. Create a reference implementation of a Local Packet Design Database.
3. Create an application (Application1) that will: (a) Display a form (Form1) that is based on some particular Packet Design, (b) Allow the user to various sets of input data into Form1, (c) Lookup the Packet Design associated with Form1 in PC1's Local Packet Design Database (local DB 722), (d) Generate an Interface Barcode conforming to the attached specification, the Packet Design, and the set of user input data, and (e) Print the Interface Barcode.
4. Scan the Interface Barcode and validate the information.

An endorsement validation unit 150 (Application2) is created and is based on a Form2 that is different from Form1 above. Both forms have certain common fields. Raw data is scanned from an interface barcode created by Application1. The packet design of the scanned barcode in PC2's local packet design database is retrieved. The scanned data is decoded based on the packet design. Any common fields are determined between the interface barcode and the associated field data is entered into the appropriate area of Form2.

The endorsement management infrastructure 710 synchronizes the packet design databases. The management infrastructure can push information to issuance and/or validation entities, and can also pull information from issuance and/or validation entities, in either case to synchronize the endorsement and other data within various local and remote databases.

Synchronization begins with creation of a reference implementation of a common packet design database (common DB-0 712). A subscription is created between local DB-1 722 and common DB-0 712 such that (1) when local DB-1 722 indicates that a packet design is to be published, the subscription will replicate that packet design in common DB-0 712, (2) when a published packet design in local DB-1 722 is changed, the changes are replicated in common DB-0 712, (3) when another user published a packet design to common DB-0 712, that packet design is replicated in local DB-1 722, and (4) when a published packet design in common DB-0 712 is changed, the changes are replicated in local DB-1 722. A subscription is also created between local DB-2 732 and common DB-0 712.

The foregoing description of the exemplary embodiments of the invention has been presented only for the purposes of illustration and description and is not intended to be exhaustive or to limit the invention to the precise forms disclosed. Many modifications and variations are possible in light of the above teaching.

The embodiments were chosen and described in order to explain the principles of the invention and their practical application so as to enable others skilled in the art to utilize the invention and various embodiments and with various modifications as are suited to the particular use contemplated. Alternative embodiments will become apparent to those skilled in the art to which the present invention pertains without departing from its spirit and scope. Accordingly, the scope of the present invention is defined by the appended claims rather than the foregoing description and the exemplary embodiments described therein.

What is claimed is:

1. A system for automating the issuance, management and conveyance of endorsements to authorities, the system comprising:
   an endorsement issuance module configured to issue an endorsement associated with an endorsee, wherein the issued endorsement prescribes to specified endorsement issuance rule definitions provided by one or more authorities, the endorsement issuance module further comprising:
      an endorsee identification unit that retrieves at least one credential from said endorsee via an input device, wherein each credential provides for at least one endorsement from at least one authority and wherein each credential includes a digital seal that restricts access to the credential from at least one other authority different from the at least one authority; and
      an endorsement creation unit for adding at least one new endorsement to at least one of said credentials, said new endorsement added within a private field of a digital seal of a bar code;
   an endorsement conveyance module configured to receive the new endorsement from the endorsement issuance module, and to validate the new endorsement according to specified endorsement conveyance rules; and
   an endorsement management module configured to maintain specified rules according to an authority, the endorsement management module configured for:
      accessing a database for rules and protocol associated with valid endorsement registrations;
      receiving specified endorsement issuance rules from the endorsement issuance module;
      receiving specified endorsement conveyance rules from the endorsement conveyance module;
      pushing specified endorsement rules to the endorsement issuance module as specified endorsement issuance rules; and
      pushing specified management conveyance rules to the endorsement conveyance module as specified endorsement conveyance rules,
   wherein results of endorsement validation are presented to at least one of the following:
      an automated environment for providing access to endorsee,
      an automated environment for recording validation results,
      a display for providing validation results to a user.

2. The system of claim 1, wherein the digital seal utilizes a P5-ID private field within the bar code.

3. A system for automating the issuance, management and conveyance of endorsements to authorities, the system comprising:
   an endorsement issuance module configured to issue an endorsement associated with an endorsee, wherein the issued endorsement prescribes to specified endorsement issuance, rule definitions provided by one or more authorities, the endorsement issuance module further comprising:
- an endorsee identification unit that retrieves at least one credential from said endorsee via an input device, wherein each credential provides for at least one endorsement from at least one authority and wherein each credential includes a digital seal that restricts access to the credential from at least one other authority different from the at least one authority; and
- an endorsement creation unit for adding at least one new endorsement to at least one of said credentials, said new endorsement added within a private field of a digital seal of a bar code;
- an endorsement conveyance module configured to receive the new endorsement from the endorsement issuance module, and to validate the new endorsement according to specified endorsement conveyance rules; and
- an endorsement management module configured to maintain specified rules according to an endorsement management module,
- wherein results of endorsement validation are presented to at least one of the following:
  - an automated environment for providing access to endorsee,
  - an automated environment for recording validation results,
  - a display for providing validation results to a user.

4. The system of claim 3, the endorsement issuance module further comprising an endorser identification unit configured to verify that a user has privilege to create an endorsement.

5. The system of claim 3, the endorsement issuance module further comprising an endorsee identification unit configured to verify credentials of an endorsee.

6. The system of claim 5, the endorsement issuance module further comprising an endorsement selection unit configured for selection of endorsement options according to results provide by the endorsee identification unit.

7. The system of claim 6, further comprising an endorsement creation unit configured to add at least one endorsement to endorsee credentials.

8. The system of claim 3, further comprising an endorsement rules database capable of receiving rules from the authority.

9. The system of claim 8, wherein the endorsement rules database is capable of pushing rules to the authority.

10. The system of claim 3, further comprising an issued registrations database capable of uploading registrations to the authority.

11. The system of claim 3, the endorsement conveyance module further comprising an endorsement validation unit to determine the validity of the endorsement and to provide validity results to an action module configured for decision making.

12. The system of claim 11, further comprising an automated decision making process.

13. The system of claim 11, further comprising an activity upload unit configured for pushing endorsement data to at least one authority for synchronization of the endorsement data.

14. The system of claim 11, further comprising a rules download unit configured to receive rules and protocols from at least one authority, wherein the received rules an protocols provide for synchronized endorsement verification.

15. The system of claim 3, the endorsement management module further comprising a central authority database for rules and protocol associated with valid endorsement registrations.

16. The system of claim 15, the endorsement management module further configured to receive the specified endorsement issuance rules from the endorsement issuance module.

17. The system of claim 15, the endorsement management module further configured to receive the specified endorsement conveyance rules from the endorsement conveyance module.

18. The system of claim 15, the endorsement management module further configured to push specified management endorsement rules to the endorsement issuance module as specified endorsement issuance rules.

19. The system of claim 15, the endorsement management module further configured to push specified management conveyance rules to the endorsement conveyance module as specified endorsement conveyance rules.

* * * * *